United States Patent

[11] 3,594,729

[72] Inventor Saburo Uemura
Yokohama-shi, Japan
[21] Appl. No. 691,787
[22] Filed Dec. 19, 1967
[45] Patented July 20, 1971
[73] Assignee Sony Corporation
Tokyo, Japan
[32] Priority Dec. 19, 1966
[33] Japan
[31] 41/83365

[54] DATA RETRIEVAL SYSTEM

8 Claims, 4 Drawing Figs.

[52] U.S. Cl. .......... 340/172.5, 178/6.6
[51] Int. Cl. .......... G11b 5/02
[50] Field of Search .......... 340/172.5; 178/6.6

[56] References Cited

UNITED STATES PATENTS

| | | | |
|---|---|---|---|
| 2,396,409 | 3/1946 | Berzer | 179/100.2 |
| 3,013,254 | 12/1961 | Walker | 340/172.5 UX |
| 3,278,678 | 10/1966 | Rank | 178/6.6 |
| 3,294,902 | 12/1966 | Maxey | 178/6.6 |
| 3,402,257 | 9/1968 | De Lange | 178/6.6 |
| 3,407,266 | 10/1968 | Tsuneo Araki et al. | 178/6.6 |
| 3,157,739 | 11/1964 | Shiro Okamura | 178/6.6 A |
| 3,157,738 | 11/1964 | Shiro Okamura | 178/6.6 A |

*Primary Examiner*—Gareth D. Shaw
*Assistant Examiner*—Mark Edward Nusbaum
*Attorneys*—Albert C. Johnston, Robert E. Isner, Lewis H. Eslinger and Alvin Sinderbrand

ABSTRACT: In a data retrieval system employing a magnetic tape or other recording medium having index signals at intervals therealong for identifying respective tape portions and being moved past a head which is cyclically displaced to scan stripelike areas extending across the tape, the tape is driven at a high speed to rapidly bring a selected index signal near to the head and then the movement of the tape is continued at a low speed at which a plurality of the areas scanned by the head are in overlapping relation, and the head is operated to record or reproduce data signals only during one of its cyclical displacements upon the selected index signal reaching a predetermined position in the course of the continued low speed movement of the tape.

INVENTOR
SABURO UEMURA
BY Lewis H. Eslinger
ATTORNEY

INVENTOR
SABURO UEMURA
BY Lewis H. Eslinger
ATTORNEY

DATA RETRIEVAL SYSTEM

This invention relates generally to a data retrieval system, and more particularly is directed to a magnetic recording and reproducing system by which various bits or pieces of information can be recorded and ready access may be had to any selected bit or piece of the recorded information for virtually instantaneous reproduction thereof.

It is now well known to utilize a magnetic recording and reproducing system to record and reproduce motion pictures or television video signals, such a system being commonly referred to as a video tape recorder. In video tape recorders, the television signals are recorded and reproduced or displayed in a specified order and time relationship corresponding to the order and time relationship of the respective frames. It has also been proposed to employ a similar system for recording and selectively reproducing or displaying various bits or pieces of information, such as the contents of books, photographs, graphs, tables, or other documents convertible into corresponding data or document signals in the form of video signals which are recorded on a magnetic tape and thereafter reproduced therefrom. It will be apparent that each recorded data or document signal bears no specified time relationship to any other document signal, so that the retrieval of any selected bit or piece of recorded information requires that each such bit or piece of information be recorded in association with a particular index signal by which it can be located and identified when its reproduction or display is desired.

In my copending U.S. Pat. application Ser. No. 591,596, I have disclosed a data retrieval system of the type described above in which the index or identification signals are all the same and the locations along a magnetic tape at which the various bits or pieces of information are recorded are identified and selected by counting the numbers of such index signals from one end or the other of the tape to the location of the selected document signal. In such data retrieval system, the magnetic tape is held stationary or brought to rest whenever a data or document signal is to be recorded on, or reproduced from a selected location along the tape. However, this requires a complicated mechanism for stopping the tape rapidly and accurately at the desired location for each recording or reproducing of a document signal, and further an undesirably long time is required for access to, and reproduction or display of any selected document signal.

Accordingly, it is an object of this invention to provide a data retrieval system wherein document signals are recorded on, and reproduced from a magnetic tape and which is arranged to substantially simplify the driving of the tape and its control.

Another object is to provide a data retrieval system with which the recording of the document signals is facilitated.

Another object is to provide a data retrieval system in which ready and quick access may be had to any of the recorded information.

Still another object is to provide a data retrieval system in which, during reproduction of a document signal recorded in a particular record track on the magnetic tape, the alignment of the playback or reproducing head with the record track is sufficiently close to afford a high signal to noise ratio and a stable video picture to display the corresponding document.

A data retrieval system according to this invention makes use of a magnetic recording and reproducing unit in which a magnetic medium, for example, in the form of a tape, has index signals recorded or otherwise provided thereon at intervals in the direction of movement of the medium for identifying respective portions thereof, a magnetic head is mounted at a recording and reproducing station past which the medium is movable and is operable selectively to record and reproduce data or document signals in each such medium portion, and the head is cylindrically moved across the medium, for example, by being rotated in a plane arranged obliquely to the direction of tape movement, to scan stripelike areas of the medium moved past the recording and reproducing station.

In accordance with an aspect of this invention, the tape or other magnetic medium is driven at a high speed upon the selection of a particular index signal to rapidly bring the selected index signal and the respective medium portion near to the recording and reproducing station, and, when the selected index signal nears such station, movement of the medium is continued at a low speed selected so that the stripelike areas then scanned by the cyclically moved head are in overlapping relation, with the head being operated only during one of the cyclical movements thereof to either record or reproduce data signals in response to the selected index signal reaching a predetermined position relative to the recording or reproducing station in the course of the continuing low speed movement of the medium.

The pitch or distance along the recording medium between successive index signals, the frequency of the cyclical movements of the head and the low speed at which the medium is moved during recording or reproducing of data signals are selected so that the head scans a whole number, preferably from 3 to 5, of overlapping stripelike areas on the medium during the movement of the latter at the low speed through a distance equal to the pitch of the index signals, and the width of each stripelike area scanned by the head is selected to be a major portion, for example, two-thirds of the width of each identified portion of the medium. When the foregoing relationships are adopted, there is no need to synchronize the movement of the recording medium with the cyclic movement of the head as the maximum possible error in the positioning of each record track containing data or document signals with respect to the index signal identifying the same is maintained small enough to avoid a detrimental decrease in the signal to noise ratio when reproducing the recorded data or document signals. Avoidance of the necessity of synchronizing the movement of the tape or other recording medium with the rotary or other cyclic movement of the head obviously makes possible very substantial simplification of the drives of the system in accordance with the invention.

In accordance with another feature of this invention, the data retrieval system further includes a data or document signal storing device which is operative to store the data signals and reproduce the same for feeding to the head of the recording and reproducing unit when such head is operated to record on the associated tape or other recording medium, and which is also operative to record the data signals reproduced by the head of the recording and reproducing unit and to reproduce the same continuously, when desired, for operating a monitor to visually display the corresponding data or document.

The above and other objects, features and advantages of this invention, will be apparent in the following detailed description of an illustrative embodiment which is to be read in connection with the accompanying drawings, wherein.

Figure 2:
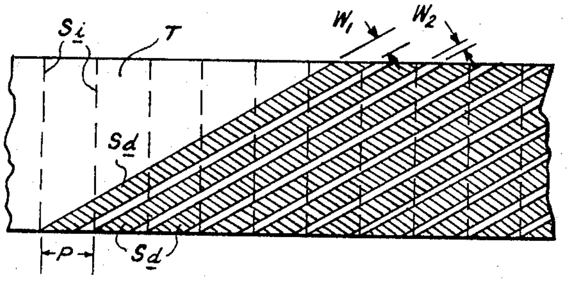
FIG. 2 is a fragmentary view of a portion of a magnetic recording tape having data or document signals recorded in skewed or oblique tracks which are identified by respective index signals.
Figure 3:
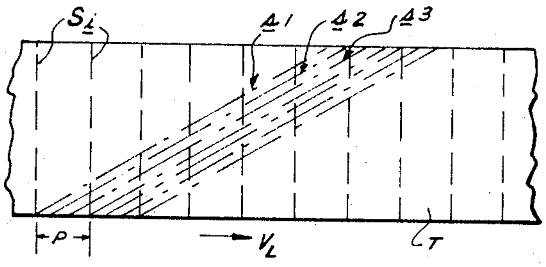
Figure 3:
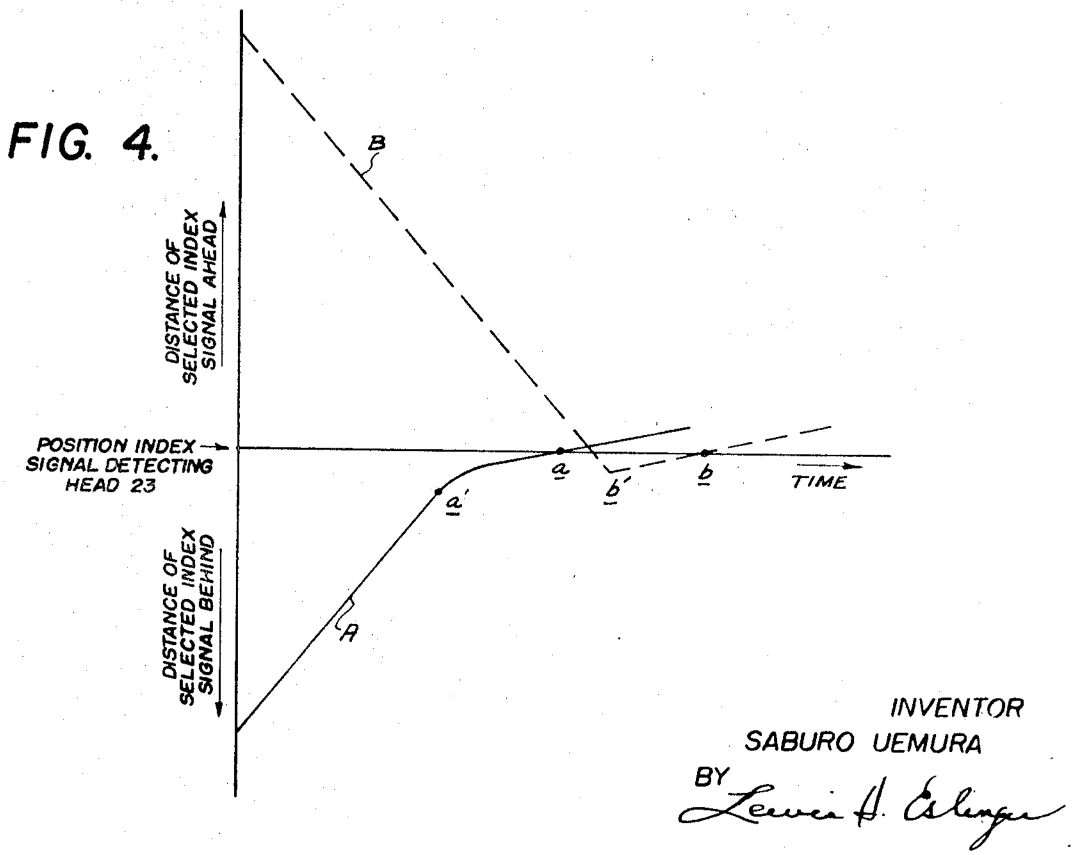

FIG. 3 is a view similar to that of FIG. 2, but showing the paths on the tape scanned by a magnetic recording and reproducing head in the course of low speed movement of the tape; and FIG. 4 is a graph illustrating the manner in which the speed of movement of the tape is controlled when particular index signals are selected for recording or reproduction of data signals in respective record tracks on the tape.

Figure 1:
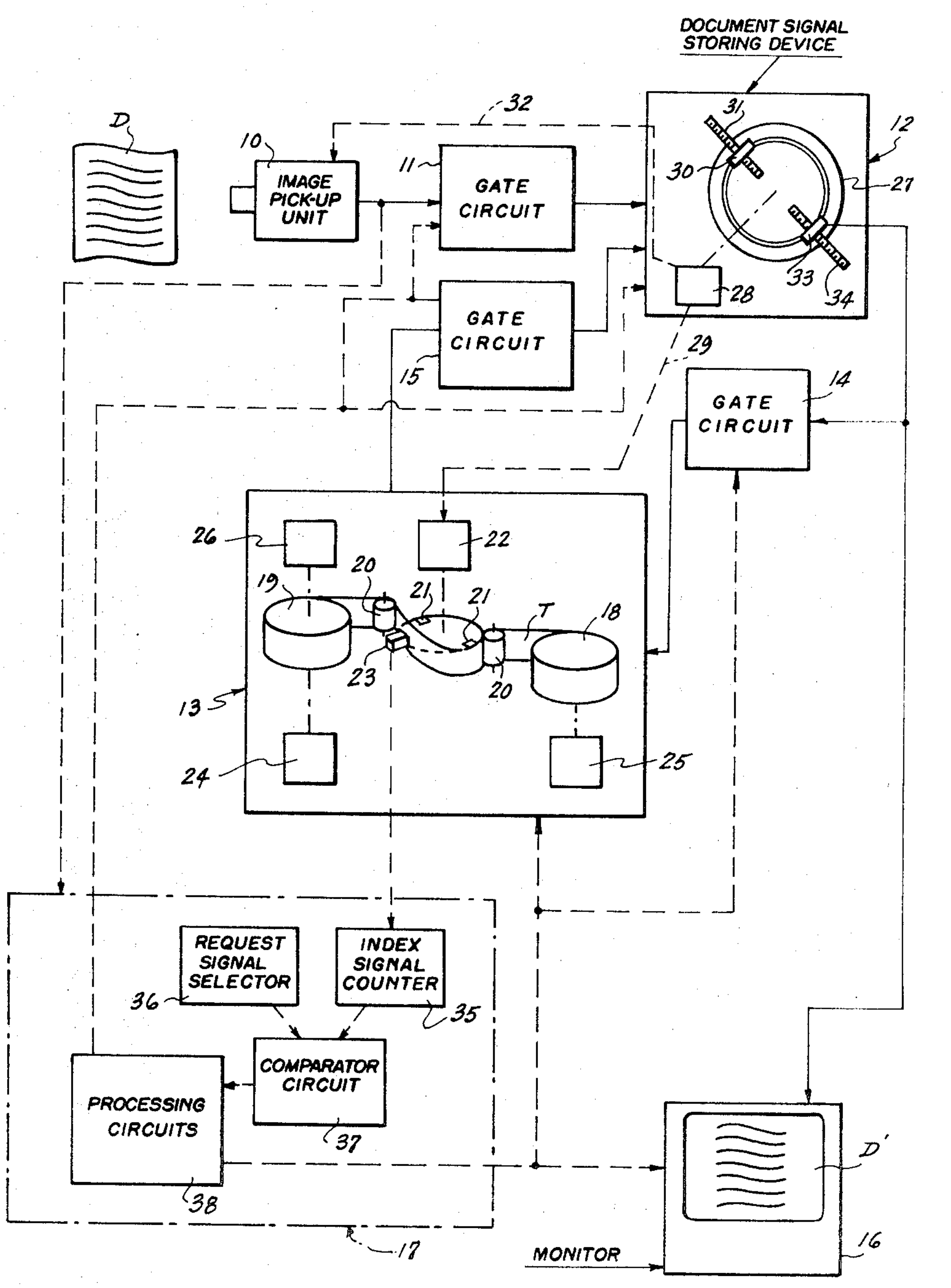
FIG. 1 is a schematic and block diagram illustrating the major components and their operating relationships in a data retrieval system according to this invention.

Referring to FIG. 1 in detail, it will be seen that a data retrieval system according to this invention is there shown to comprise an image pickup unit or television camera 10 which may be of the type that is commercially available from the Sony Corporation under Model No. CVC-100 or CVC-2000. The camera 10 is provided for picking up the image of a document D and converting the same into a corresponding data or document signal which is to be transmitted through a gate circuit 11 to a document signal storing device 12 where the document signal is recorded and can be reproduced repeatedly for any desired duration. The signal storing device 12 may be a disc memory, such as, for example, the type 2311 Disc Storage Drive, with or without a type 2841 Storage Control Unit available commercially from IBM, or the memory disclosed in U.S. Pat. No. 2,950,353. A magnetic recording and reproducing unit 13 is provided to receive reproduced document signals through a gate circuit 14 from storing device 12. Further, each document signal recorded in unit 13 and reproduced by the latter can be transmitted therefrom through a gate circuit 15 to device 12 for recorded storage therein and repetitious reproduction or playback for a duration suitable to display a readable image D' of the document D on a display unit or monitor 16 which also receives the reproduced document signal from storing device 12. The gate circuits 11, 14 and 15 may be of conventional, commercially available types, for example, as disclosed in "Pulse Digital and Switching Waveforms," by Jacob Millman and Herbert Taub, 1965, McGraw-Hill Book Co., New York, N.Y., and particularly in Chapter 17 thereof beginning at page 725 and entitled "Sampling Gates." The date retrieval system is further shown to comprise a control unit 17 for controlling image pickup unit 10, gate circuits 11, 14 and 15, storing device 12, magnetic recording and reproducing unit 13 and display unit 16.

The magnetic recording and reproducing unit 13 generally includes a magnetic recording medium in the form of a tape T movable along a path between a supply reel 18 and takeup reel 19 and being guided in such path, as by rollers 20, to wrap partially around the periphery of a cylindrical guide having one or more magnetic heads 21 rotated as by a drive 22, in a plane that extends obliquely with respect to the direction of movement of tape T between guide rollers 20. Thus, during each revolution of each head 21, for example, at a rotational speed of 15 revolutions per second, each head scans a stripelike area of the tape extending thereacross obliquely with respect to the longitudinal direction of movement of the tape.

As shown in FIG. 2, the magnetic tape T has index signals S*i* recorded thereon at intervals in the direction of movement of the tape and each corresponding to and identifying a document signal S*d* recorded, or to be recorded, in a track extending obliquely to the direction of tape movement similarly to the stripelike areas scanned by each head 21. The document signal S*d* recorded in each oblique or skew track represents one document page which is to be recorded and then retrieved and displayed at monitor 16. Although index signals S*i* extending across the tape at right angles to the direction of tape movement and document or data signals S*d* in oblique or skew tracks overlap each other, as shown on FIG. 2, only the index signals S*i* are reproduced by a multigap magnetic head 23 (FIG. 1) in response to the movement of the tape between reels 18 and 19.

As disclosed in my previously mentioned copending application Ser. No. 591,596, all of the index signals S*i* may be the same, in which case each document signal S*d* is identified by the number of its corresponding index signal counted from one end or the other of tape T, and any particular document signal can be located merely by moving the tape between reels 18 and 19 and counting the reproduced signals from head 23 until the number of such signals corresponds to that of the index signal identifying the desired document signal.

The magnetic recording and reproducing device 13 further is shown to have a drive 24 for effecting high speed forward movement of tape T from reel 18 to reel 19, a drive 25 for effecting high speed reverse or rewinding movement of the tape from reel 19 to reel 18, and a drive 26 for effecting forward movement of the tape, but at a predetermined low speed, as hereinbefore described in detail.

In the illustrated embodiment of the invention, successive document signals from image pickup unit 10 are not recorded directly on tape T of unit 13, but rather are recorded in sequence in relatively radially displaced annular tracks on a magnetic disc or sheet 27 of storing device 12. The disc 27 is rotated by a drive 28 preferably in synchronism with the rotary heads 21 of unit 13, as represented schematically at 29, so that disc 27 turns through a complete revolution in the time required for each head 21 to move completely across tape T. Of course, where unit 13 has two diametrically opposed heads 21, as shown, the rotational speed of disc 27 is required to be twice that of the heads 21. The recording head of storing device 12 is represented at 30, and is moved radially with respect to disc 27, as by a suitably driven screw 31. Further, as represented schematically at 32, the operation of image pickup unit 10 is synchronized with the rotation of magnetic disc 27 so that the latter will complete a single revolution during the period required for the image pickup unit 10 to transmit a document signal representing the entire document D through gate conduit 11 for recording by head 30 in an annular track on disc 27. After each document signal is transmitted from unit 10 through gate circuit 11 and recorded in a respective annular track on disc 27, recorded head 30 is radially shifted so that the next received document signal will be recorded in another annular track.

The storing device 12 is further shown to have a playback or reproducing head 23 which is radially movable relative to disc 27, as by a suitably driven screw 34, for registry with any selected annular track on disc 27, whereby to reproduce the document signal recorded in the selected track. Although a complete document signal is reproduced by head 33 during a single revolution of disc 27, the operating cycle of unit 13 for recording a single complete document signal in a skew track on its tape T, or for reproducing such document signal, requires that the heads 21 of unit 13 scan the tape T *m* times (in which *m* is a whole integer preferably from 3 to 5). In the case where two heads 21 are employed, as shown, the number of revolutions of the heads required for each recording or reproducing cycle of unit 13 will be *m*/2 which, as previously mentioned, corresponds to *m* revolutions of disc 27. However, gate circuit 14 is opened only during one scan by a head 21 and one revolution of disc 27, as hereinafter described in detail, to pass a single complete reproduced document signal from head 33 to heads 21 for recording on tape T, and, during the remaining ($m-1$) revolutions of disc 27 for completing a recording or reproducing cycle of unit 13, gate circuit 14 is closed and head 33 may be radially shifted for registration with the annular track containing the next document signal to be reproduced thereby.

The low speed $V_L$ at which tape T is driven upon operation of drive 26 is selected to cause advancement of tape T through the distance or pitch P (FIG. 2) between adjacent index signals S*i* in the time required for *m* scans of the tape by heads 21, and the distance or pitch P between adjacent index signals is selected so that the corresponding skew tracks containing recorded document signals S*d* will be as close to each other as possible, but in spaced relationship. Thus, for example, if the width $W_1$ of each stripelike area scanned by each head 21, and hence of each skew track containing a document signal S*d*, is 0.2 mm., the width $W_2$ of each intervening or nonrecorded zone may be 0.1 mm., leading to a pitch of 0.3 mm. between adjacent index signals S*i*. If the value of *m* is selected to be 3 and heads 21 are rotated at 15 revolutions per second to effect each scan of tape T in one-thirtieth second, that is, to complete 3 scans in one-tenth second, then the low speed $V_L$ at which the tape may be driven by drive 26 should be selected to be 3 mm./sec. Similarly, if *m* is selected to be 5, then the low speed $V_L$ of the tape should be reduced to 1.8 mm./sec.

The high speed $V_H$ at which the tape T is driven in either the forward direction or the rewind direction by the selective operation of drive 24 or drive 25, respectively, may be very substantial and is only limited by the frequency at which head 23 can reproduce the index signals S*i* passing thereby on the tape.

The control unit 17 is shown schematically to include a counter 35 which receives the reproduced index signals S*i* from head 23 and counts the number of such signals received in movement of the tape T from an initial position, where one end or the other of the tape is at the position of head 23, to any instantaneous position of the tape at which a particular index signal is disposed at head 23 and, based on such count of the received index signals, counter 35 issues an electrical signal of a magnitude or other characteristic corresponding to the instantaneous position of the tape. Unit 17 further includes a request signal selector 36 which is operative to generate a signal corresponding to a requested track of tape T in which a document signal from storing device 12 is to be recorded, or from which a document signal is to be reproduced for feeding to storing device 12. The request signal from selector 36 and the tape position indicating signal from counter 35 are both fed to a comparator circuit 37 which compares such signals and, independence on their relative magnitudes or other characteristics, issues suitable signals to gate circuits 38 for effecting the necessary control functions. The counter 35, selector 36 and comparator circuit 37 may form an arrangement similar to that disclosed in U.S. Pat. No. 3,392,914, and adapted to function in the manner described in detail hereinbelow. The counter 35, selector 36 and comparator circuit 37 may form an arrangement similar to that disclosed in U.S. Pat. No. 3,392,9.14 and adapted to function in the manner described in detail hereinbelow.

The above-described data retrieval system in accordance with this invention operates as follows:

I. Recording of Document Signals on Tape T.

When a document signal is issued by image pickup unit 10, processing circuits 38 of control unit 17 generate a pulse to open gate circuit 11 and permit the document signal to pass therethrough to head 30 of storing device 12. The gate circuit 11 is open only for the period of time required for the passage therethrough of a complete document signal, during which period disc 27 rotates in a single revolution, and the document signal is recorded in a single annular track on the disc. Thereafter, for example, during the following $m-1$ revolutions of disc 27, head 30 may be radially shifted to scan another annular track on disc 27, whereupon, gate circuit 11 can open again for a single revolution of disc 27 to permit the recording on such other annular track of the next document signal received from image pickup unit 10. Thus, document signals corresponding to documents successively exposed to the view of image pickup unit 10 can be recorded in successive annular tracks of disc 27 for storage in device 12. One of the factors to be considered in determining the numerical value of $m$ is the time required for radial shifting of recording head 30 by screw 31. Thus, of 0.1 second is required for radially shifting head 30 from one annular track to the next and if the time required for one complete document signal, and hence for one revolution of disc 27, is one-thirtieth second, then shifting of head 30 will occur during the time required for 3 revolutions of disc 27 and the value of $m$ has to be greater than 4.

When the document signals stored in device 12 are to be recorded on selected tracks of tape T, selector 36 is actuated to produce a request signal corresponding to the position on tape T at which recording of document signals is to commence. The request signal and the signal from counter 35 corresponding to the instantaneous position of the tape T are compared in circuit 37 and, upon any deviation therebetween, suitable signals are issued by circuit 37 to process circuits 38 and cause the latter to initiate the following operations. Depending upon whether the position of the tape corresponding to the request signal is before or after the instantaneous position of the tape as represented by the signal from counter 35, either drive 24 or drive 25 is operated to effect the high speed movement of the tape T between reels 18 and 19 in the direction for moving the requested position on the tape toward head 23. When the number of the index signal scanned or detected by head 23 approaches the number of the index signal identifying the requested position on the tape, that is, when the requested position on the tape nears the head 23, the reduced deviation between the signals from counter 35 and selector 36, as sensed by circuit 37, results in drive 26 being rendered operative to continue the movement of the tape T at the previously defined low speed $V_L$. During such low speed movement of the tape, heads 22 of unit 13 effect $m$ scanning movements across the tape for each movement of the tape through the distance P between adjacent index signals S*i*. For example, if $m$ has a value of 3, heads 21 scan 3 skewed or obliquely arranged stripelike areas on the tape during movement of the tape through the distance P, as shown in FIG. 3 where the centerlines of the three scanned areas are indicated at *s*1, *s*2 and *s*3. Obviously, if the width $W_1$ of each stripelike scanned area is a major proportion of the distance P, for example, approximately 2/3P, then 3 stripelike areas of the tape successively scanned by heads 21 with the centerlines of such areas being only P/3 apart will overlap each other by approximately $1/2W_1$.

When the index signal S*i* identifying the selected position on the tape at which recording of document signals is to commence reaches the position of head 23 so that the signal from counter 35 corresponds with the request signal from selector 36, the resulting signal from comparator circuit 37 causes the processing circuits 38 to open gate circuit 14 for the period required for a single revolution of disc 27 and hence for a single complete scanning movement of a head 21 across tape T. During that single scanning movement, the document signal in an annular track on disc 27 is reproduced by head 33 of storing device 12 and fed therefrom through open gate 14 for recording by a head 21 of unit 13 in an oblique record track on the portion of tape T identified by the previously selected index signal. It will be noted that such recording of the document signal on tape T occurs while the latter continues to move at the low speed $V_L$.

If desired, the selector 36 may be arranged to produce successive request signals corresponding to successive index signals on tape T. In that case, following the recording of a document signal on tape T, as described above, reproducing head 33 is shifted radially during the $m-1$ revolutions of disc 27 that follow the recording of the document signal on tape T so that, when the next index signal is detected by head 23 and gate circuit 14 is again opened, another document signal reproduced by head 33 is fed through the open gate 14 for recording by a head 21 in an oblique or skew track on the portion of tape T identified by that next index signal.

In the foregoing description, it has been assumed that the index signals S*i* were previously recorded on otherwise provided on magnetic tape T so as to be used in positioning the tape when the latter is to have document signals recorded thereon. However, if desired, recording of document signals on tape T can commence at one end thereof with the tape being driven at low speed $V_L$ by drive 26, and gate circuit 14 may include means for opening such gate at predetermined time intervals each corresponding to one revolution of disc 27 during each $m$ revolution thereof, and further for generating a pulse upon each opening of gate circuit 14 which pulse is fed to head 23 for recording an index signal on tape T in a position corresponding to that of the record track in which a document signal is simultaneously recorded on the tape T.

II. Reproducing Document Signals from Tape T.

After document signals have been recorded on tape T, as described above, the retrieval of any document signal selected at random is initiated by actuation of selector 36 to produce a request signal corresponding to the position of the desired document signal as identified by the respective index signal. Once again, the request signal is compared with the instantaneous position of the tape T as identified by counter 35, and drive 24 or 25 is rendered operative to effect the high speed movement of the tape T in the direction for rapidly bringing the portion of the tape having the desired document signal recorded thereon near to head 23. When the desired document signal nears the position of head 23, as determined by a comparison of the signal from counter 35 with the request signal from selector 36, the tape T is made to move at the low speed $V_L$ by the operation of drive 26. When, during such low speed movement of tape T, the index signal $S_i$ which identifies the desired document signal reaches the position of head 23, the correspondence of the request signal and the signal from counter 35 causes processing circuits 38 to open gate circuit 15 for the immediately following scanning movement of a head 21 across tape T. During such scanning movement, the head 21 effecting the same reproduces the desired document signal, and the reproduced document signal is fed through open gate circuit 15 to head 30 for recording in an annular track on disc 27. Gate circuit 15 remains open only during a single scanning of tape T by one of the heads 21, that is, during a single revolution of disc 27 which is sufficient for the recording of a complete document signal in an annular track thereon. During the remaining $m-1$ revolutions of disc 27, which occur while tape T is completing its low speed movement through the distance P, head 30 is radially shifted to register with another annular track on disc 27. Selector 36 can then be again actuated to select another document signal of tape T for reproduction and recording in such other annular track of disc 27, as previously described. Thus, successive annular tracks on disc 27 can have recorded therein respective document signals that have been reproduced from tape T in any desired order.

When storing device 12 has separate recording and reproducing heads, as at 30 and 33 on FIG. 1, and such heads can be radially shifted independently of each other, each document signal reproduced from tape T and fed through gate circuit 15 to head 30 for recording by the latter on an annular track of disc 27 during a single revolution of the latter can be immediately thereafter repetitively reproduced by head 33 and fed to monitor 16 to provide a visual display D' of the corresponding document for a period sufficient to permit the identification of the document or even the reading or study thereof. It will also be apparent that, during the transfer of document signals from image pickup unit 10 through gate circuit 11 to head 30 for recording on annular tracks of disc 27, head 33 can be successively registered with the annular tracks to reproduce the corresponding document signals for feeding to monitor 16, whereby the latter will display the documents being recorded in storing device 12. The monitor 16 can also receive the document signals from storing device 12 when such signals are fed to recording and reproducing unit 13, thereby to display the documents being recorded on tape T. Of course, after document signals reproduced from tape T of unit 13 have been recorded in all of the available annular tracks of disc 27, head 33 may be radially positioned to register with any selected track while disc 27 is continuously rotated for repetitively reproducing the document signal therein, with the output of head 33 being then fed to monitor 16 for providing a display D' of the respective document or data for as long as required.

The document signals reproduced from tape T of unit 13 cannot be directly applied to monitor 16, as each document signal is reproduced only during a single scanning of the tape by a head 21 while the tape continues to move at the low speed, so that the document signal reproduced in unit 13 would result in only a fugitive display on monitor 16. However, as previously described, by recording the reproduced document signal on disc 27 of storing device 12, the retrieved document signal can then be repetitively reproduced for as long as necessary to provide a display on monitor 16 that can be studied and read. Although the document signals from image pickup unit 10 have been described as being recorded in storing device 12 prior to the recording of such document signals on tape T of recording and reproducing unit 13, such has been done only to make the rate at which document signals are successively recorded on tape T independent of the rate at which successive documents D are exposed to the view of image pickup unit 10. Thus, if desired, the document signals from image pickup unit 10 may be recorded directly on the tape T of recording and reproducing unit 13.

It is an important advantage of the data retrieval system in accordance with this invention that it is unnecessary to synchronize the movement of tape T with the rotation of the heads 21 during either recording or reproducing of document signals on the tape. The foregoing results from the fact that during recording and reproducing of document signals on tape T, rotary heads 21 scan the tape *m* times for each movement of the tape at the low speed through the distance P, with the recording or reproducing being effected only during the scan which immediately follows the detection of the respective index signal by head 23. Accordingly, even though the movement of the magnetic tape T and the rotation of the heads 21 are not synchronized the positions of the record tracks in which document signals are recorded can vary with respect to the corresponding index signals by no more than the distance $P/m$. Since the position of a record track relative to its index signal can vary by no more than $P/m$, and since the width $W_1$ of each record track and of each area scanned by a head 21 constitutes a major proportion of the pitch P, for example two-thirds thereof, it is apparent that the area scanned by a head 21 when reproducing a document signal necessarily overlaps the track of that signal by at least one-half of the width of such track if the value of *m* is at least 3. If *m* is 3, the maximum decrease in the signal to noise ratio that can result from misalignment of the scanning head with respect to the record track is not important and, if the value of *m* is 5 the possible decrease in the signal to noise ratio is so small as to be completely neglected.

The avoidance of the necessity of synchronizing the movement of the tape T with the rotation of heads 21 makes it possible to effect the fast forward or rewinding movement of the tape T for rapidly bringing the desired index signal near to the position of head 23 whereupon the speed of movement of the tape T is reduced to the low value $V_L$ at which the recording and reproducing of document signals is carried out. Thus, the time for access to any piece or bit of recorded information is very substantially reduced without employing a speed of movement of the tape during recording and reproducing that would deleteriously affect the quality thereof.

In order to simplify the structures of recording and reproducing unit 13, drives 24 and 25 are provided for the high speed forwarding and rewinding movement of tape T, but only a single drive 26 is provided for the low speed movement of the tape in the forward direction. Thus, as indicated on FIG. 4, when a requested index signal is behind the position of head 23 which is thus approached by high speed movement of the tape in the forward direction, the tape is driven at high speed, as indicated by the full line A, until the requested index signal reaches the point *a'* near to head 23, whereupon the movement in the forward direction is continued at the low speed to move the requested index signal past the point *a* at which head 23 of unit 13 detects the requested index signal to cause the recording or reproduction of the document signal on the corresponding portion of the tape. However, when the requested index signal is ahead of the position of head 23 which is thus approached by high speed movement of the tape in the rewinding direction, as indicated by the broken line B on FIG. 4, rewinding at the high speed is continued until the requested index signal has moved slightly past the position of head 23, for example, to the position indicated at *b'*, whereupon the drive 26 is operated to cause forward movement of the tape at the low speed for moving the requested index signal past the position *b* of the head 23 for initiating the recording or reproducing of a document signal on the respective portion of the tape. The foregoing mode of operation can be easily achieved with simple mechanisms that are presently available, but such mode of operation would be impossible if the movement of the tape had to be synchronized with the rotation of heads 21.

In the above-described embodiment of the invention, the unit 13 has been shown to have two diametrically opposed rotary heads 21, but it is obvious that a single rotary head may be used, in which case such head would be rotated at the same speed as disc 27 in storing device 12. Further the index signals cannot only be applied to tape T simultaneously with the recording of each document signal thereon, but it is also possible to vary the spacing between adjacent index signals.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What I claim is:

1. A data retrieval system comprising a magnetic recording medium movable in a predetermined path and having index signals thereon at intervals for identifying respective portions thereof, a magnetic head mounted adjacent to said path at a recording and reproducing station and being operable to selectively record and reproduce data signals on each of said portions of the medium, means operative upon the selection of one of said index signals for moving said medium in said path at a high speed in the direction for rapidly bringing said one of said index signals and the respective medium portion near to said station, means operative when said one index signal nears said station to continue the movement of said medium at a predetermined low speed, means for imparting cyclical movement to said head across said path at a frequency proportional to said predetermined low speed of movement of said medium in said path so as to cause said head to scan a plurality of overlapping stripelike areas of the medium during movement of the latter at said low speed through a distance corresponding to each of said intervals, and means to operate said head during only one cyclical movement thereof to selectively record and reproduce data signals in corresponding stripelike area of said respective medium portion in response to said one index signal reaching a predetermined position relative to said station in the course of the continuing movement of the medium at said low speed. 1

2. A data retrieval system according to claim 1, in which the width of each of said stripelike areas is a major proportion of said distance, and the stripelike areas scanned by said head during the low speed movement of said medium have an overlap of at least one-half of said width of each of said areas.

3. A data retrieval system according to claim 2, in which said width of each of the stripelike areas is at least two-thirds of said distance, and said head is adapted to scan at least three of said overlapping areas in said distance along said medium.

4. A data retrieval system according to claim 2, in which the width of each of said stripelike areas is at least two-thirds of said distance, and said head is adapted to scan from three to five of said overlapping areas in said distance along the medium.

5. A data retrieval system according to claim 1, further comprising a second storing device operative selectively to record and to continuously reproduce said data signals.

6. A data retrieval system according to claim 5, further comprising means connected between said head and said storing device to pass a data signal reproduced by said storing device to said head only during said one cyclical movement of the head following said one index signal reaching said predetermined position.

7. A data retrieval system according to claim 5, further comprising means connected between said head and said storing device to pass a data signal reproduced by said head to said storing device for recording and subsequent reproduction of said recorded data signal by said storing device.

8. A data retrieval system according to claim 7, further comprising visual display means operable by data signals selectively reproduced by said storing device for displaying the corresponding data.